United States Patent
Chai et al.

(10) Patent No.: US 11,042,175 B2
(45) Date of Patent: Jun. 22, 2021

(54) VARIABLE FREQUENCY VOLTAGE REGULATED AC-DC CONVERTERS

(71) Applicant: Hamilton Sundstrand Corporation, Charlotte, NC (US)

(72) Inventors: Huazhen Chai, Caledonia, IL (US); John Duward Sagona, Poplar Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/533,491

(22) Filed: Aug. 6, 2019

(65) Prior Publication Data

US 2021/0041901 A1 Feb. 11, 2021

(51) Int. Cl.
*G05F 1/46* (2006.01)
*H02M 1/42* (2007.01)
*H02M 7/12* (2006.01)

(52) U.S. Cl.
CPC ............ *G05F 1/46* (2013.01); *H02M 1/4266* (2013.01); *H02M 7/12* (2013.01)

(58) Field of Classification Search
CPC .......... G05F 1/46; H02M 1/4266; H02M 7/12
See application file for complete search history.

(56) References Cited

U.S. PATENT DOCUMENTS

| | | | |
|---|---|---|---|
| 3,214,673 A | 10/1965 | Jentje | |
| 3,978,388 A | 8/1976 | De Vries | |
| 4,095,163 A * | 6/1978 | Montague | H02H 9/005 323/231 |
| 4,369,490 A * | 1/1983 | Blum | H02M 1/4266 363/48 |
| 5,162,963 A * | 11/1992 | Washburn | H02M 1/14 361/111 |
| 5,430,362 A | 7/1995 | Carr et al. | |
| 5,471,117 A * | 11/1995 | Ranganath | H05B 41/282 315/247 |
| 5,606,232 A | 2/1997 | Harlan et al. | |
| 5,682,067 A * | 10/1997 | Manley | H01J 37/32027 204/192.12 |
| 6,166,924 A * | 12/2000 | Assow | H02M 1/4266 363/20 |
| 6,314,008 B1 * | 11/2001 | Bao | H02M 1/14 363/126 |
| 6,664,756 B2 * | 12/2003 | Horng | H02P 6/10 318/722 |

(Continued)

FOREIGN PATENT DOCUMENTS

| CN | 103401414 A | 11/2013 |
|---|---|---|
| CN | 205811868 U | 12/2016 |

OTHER PUBLICATIONS

Extended European search report issued in corresponding EP application No. 19215162.9, dated Jul. 8, 2020.

*Primary Examiner* — Emily P Pham
(74) *Attorney, Agent, or Firm* — Locke Lord LLP; Daniel J. Fiorello; Scott D. Wofsy

(57) ABSTRACT

An AC-DC converter circuit can include a plurality of passive components configured to convert AC to DC and to non-linearly regulate output DC voltage to about a selected maximum throughout an AC input voltage range and/or generator frequency. The plurality of passive components can be configured to also limit power loss as a function of load on a DC side.

15 Claims, 4 Drawing Sheets

(56) References Cited

U.S. PATENT DOCUMENTS

| | | |
|---|---|---|
| 6,844,707 B1 | 1/2005 | Raad |
| 2002/0018327 A1* | 2/2002 | Walker ................... H02H 9/023 |
| | | 361/58 |
| 2007/0178857 A1* | 8/2007 | Greene ................. H02M 7/103 |
| | | 455/127.1 |
| 2009/0015173 A1* | 1/2009 | Foo .................... H05B 41/2827 |
| | | 315/247 |
| 2010/0270942 A1* | 10/2010 | Hui ........................ H05B 45/37 |
| | | 315/291 |
| 2011/0193491 A1* | 8/2011 | Choutov ................ H05B 45/00 |
| | | 315/291 |
| 2014/0016356 A1 | 1/2014 | Furmanczyk et al. |
| 2016/0276877 A1* | 9/2016 | Weale ..................... H02J 50/80 |
| 2018/0191237 A1* | 7/2018 | Nikitin ................ H02M 1/4216 |
| 2019/0149135 A1* | 5/2019 | Rokhsaz ............ G06K 7/10336 |
| | | 333/32 |

* cited by examiner

US 11,042,175 B2

VARIABLE FREQUENCY VOLTAGE REGULATED AC-DC CONVERTERS

FIELD

This disclosure relates to AC to DC converters, e.g., for use with aircraft generators and electronics.

BACKGROUND

In aircraft where critical 28 VDC loads are powered by numerous converter regulators (CRs) fed by separate aircraft permanent magnet generator (PMG) windings, it is necessary to derive individual control power for these CR's and other circuits. This control power voltage needs to be available at the lowest possible engine speed and through the highest engine speed, which can be a very wide a speed range (e.g., more than 10:1 in certain cases).

For any electronic circuit using linear components the size and weight of the electronic components would be determined by maximum voltage, e.g., occurring at the highest speed, and the maximum current, e.g., at the lowest speed. The challenge for the design of the CR control power circuitry is to work over such wide speed or voltage range without the penalty of oversize and/or high losses. The other challenge is providing a simple and reliable circuit while addressing the other challenges.

A typical off-the-shelf DC-DC converter power supply has input voltage range of around 3:1 range, which is too narrow for certain applications. A custom designed wide input range DC-DC converter can be used to derive the CR control power, however, such traditionally custom designed converters are more complicated of a circuit than the main CR circuit. Traditional custom circuits have a high inrush during start-up that drives the component size up and creates high stress on other parts. Such circuits also include active components such as one or more MOSFETs that produce a fairly high power loss. Such known circuits generate EMI that needs additional filtering.

Another existing device includes an off-the-shelf DC-DC converter with an additional diode and MOSFET combination to narrow the input voltage range down to within the capability of the off-the-shelf DC-DC converter. The MOSFET works in the saturated state at lower input voltage, and in linear mode at higher input voltage. The losses on the MOSFET are also high, e.g., because of operation in linear mode. The other components dissipate a considerable amount of power as well. The size and weight of FET and DC-DC converters are still high. Also, because of the switching within converter, additional EMI filtering is also required.

Such conventional methods and systems have generally been considered satisfactory for their intended purpose. However, there is still a need in the art for improved converters. The present disclosure provides a solution for this need.

SUMMARY

An AC-DC converter circuit can include a plurality of passive components configured to convert AC to DC and to non-linearly regulate output DC voltage to about a selected maximum throughout an AC input voltage range and/or generator frequency. The plurality of passive components can be configured to also limit power loss as a function of load on a DC side.

The plurality of passive components can be selected from a group including an inductor, a rectifier, and a transient voltage suppression (TVS) diode. In certain embodiments, the plurality of passive components can consist of only the inductor, the rectifier, and the TVS diode.

The inductor can be on an AC side of the rectifier, and the TVS diode can be on the DC side of the rectifier. The inductor can be disposed in series with the rectifier and the TVS diode can be in parallel with the rectifier and an output line. The TVS diode can be disposed between the output line and a return line.

The output DC voltage can be within 10% of 28 VDC. In certain embodiments, the converter circuit can cause a maximum power loss of about 5 Watts or less.

The plurality of passive components can at least form a non-linear voltage divider. The output voltage can be about constant above a 400 Hz generator frequency. The converter circuit can consist of only passive components.

In certain embodiments, the plurality of passive components include an inductor, a resistor, and a rectifier. The inductor and the resistor can be disposed on an AC side of the rectifier. The inductor and the resistor can be disposed in parallel with the rectifier, for example.

In accordance with at least one aspect of this disclosure, an all-passive variable frequency non-linear AC-DC converter circuit can be configured to non-linearly convert AC voltage to DC voltage using only passive components. The passive components can be any suitable passive components, e.g., as disclosed herein.

In accordance with at least one aspect of this disclosure, a method can include non-linearly converting variable AC voltage to a selected DC voltage using only passive components. The method can include any other suitable method and/or portion thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
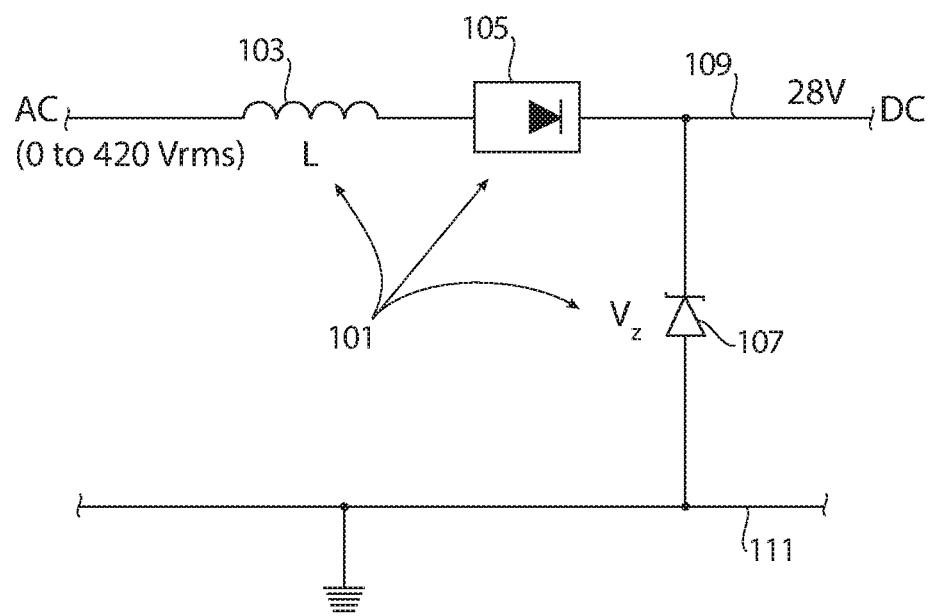
FIG. 1 is a circuit diagram of an embodiment of a converter circuit in accordance with this disclosure.
Figure 2:
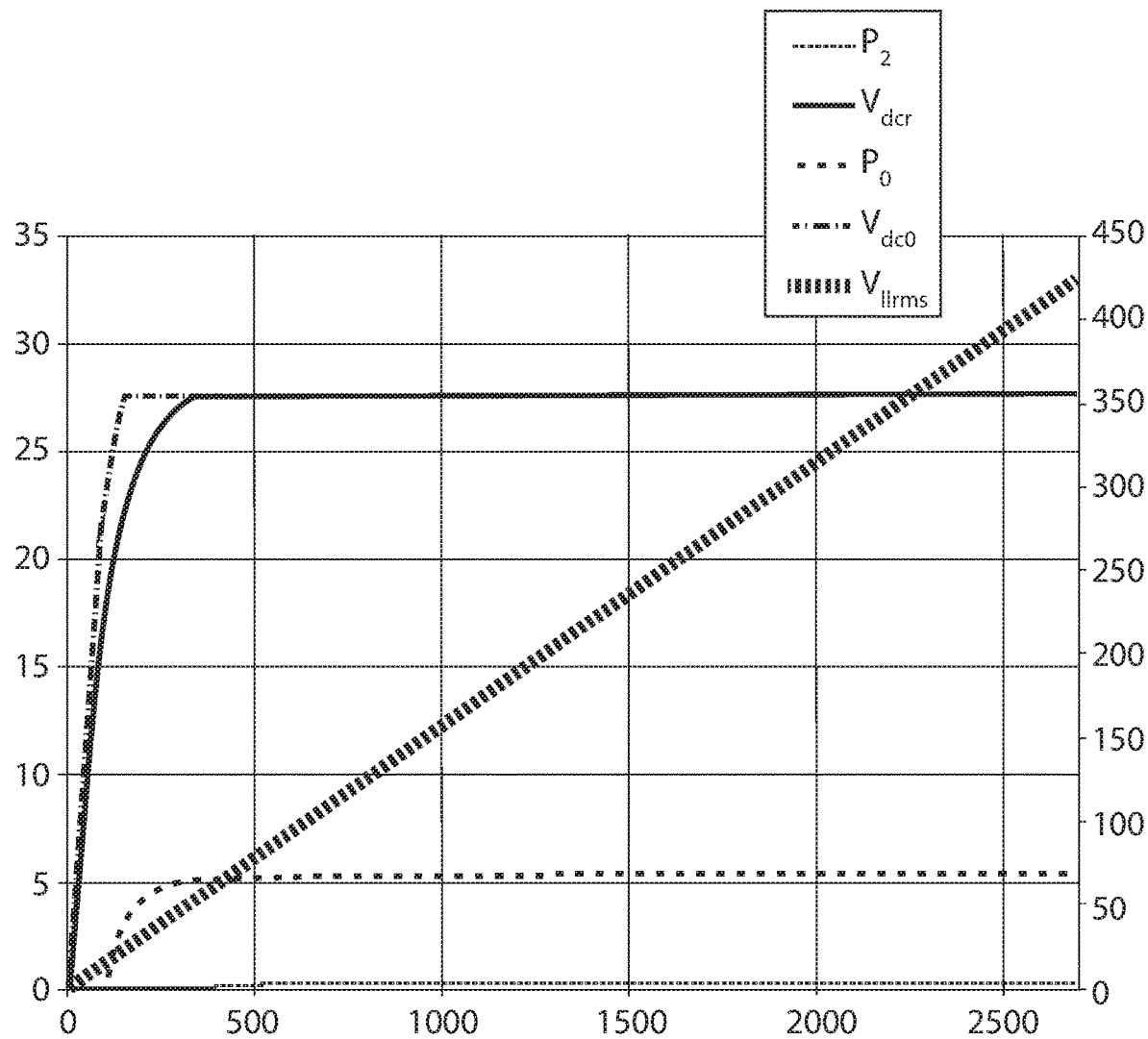
FIG. 2 is a chart of performance of an embodiment of the circuit of FIG. 1, showing a DC voltage in a no load condition (left scale in volts), a DC voltage in a maximum load condition (left scale in volts), an AC voltage (right scale in volts RMS, linear solid line), a power loss in the no load condition (left scale in watts), and a power loss in the maximum load condition (left scale in watts) as a function of generator frequency (bottom scale)
Figure 3:
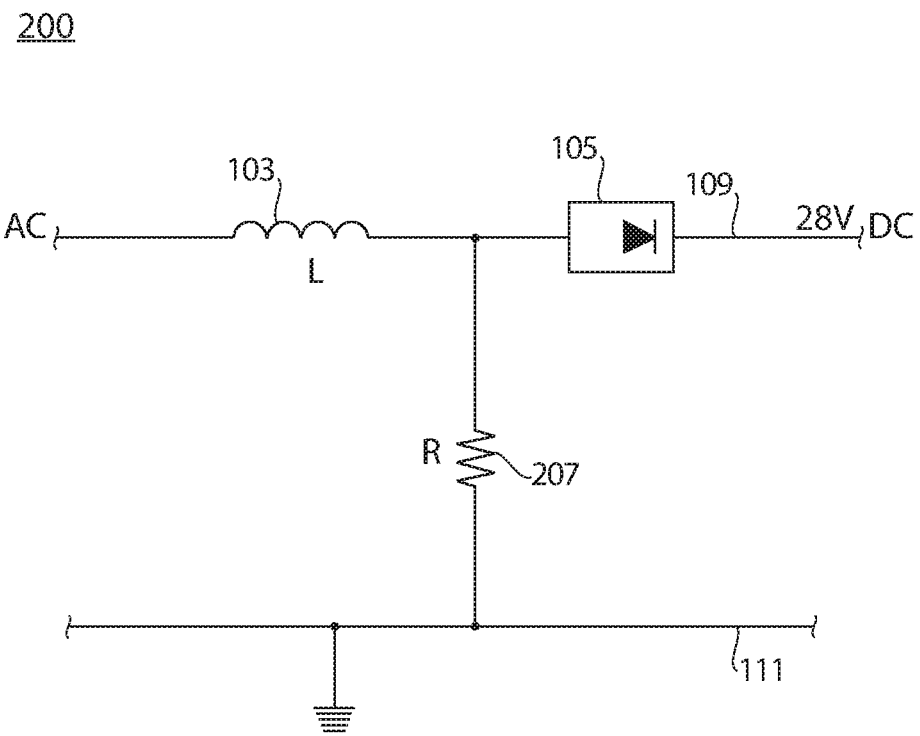
FIG. 3 is a circuit diagram of an embodiment of a converter circuit in accordance with this disclosure.
Figure 4:
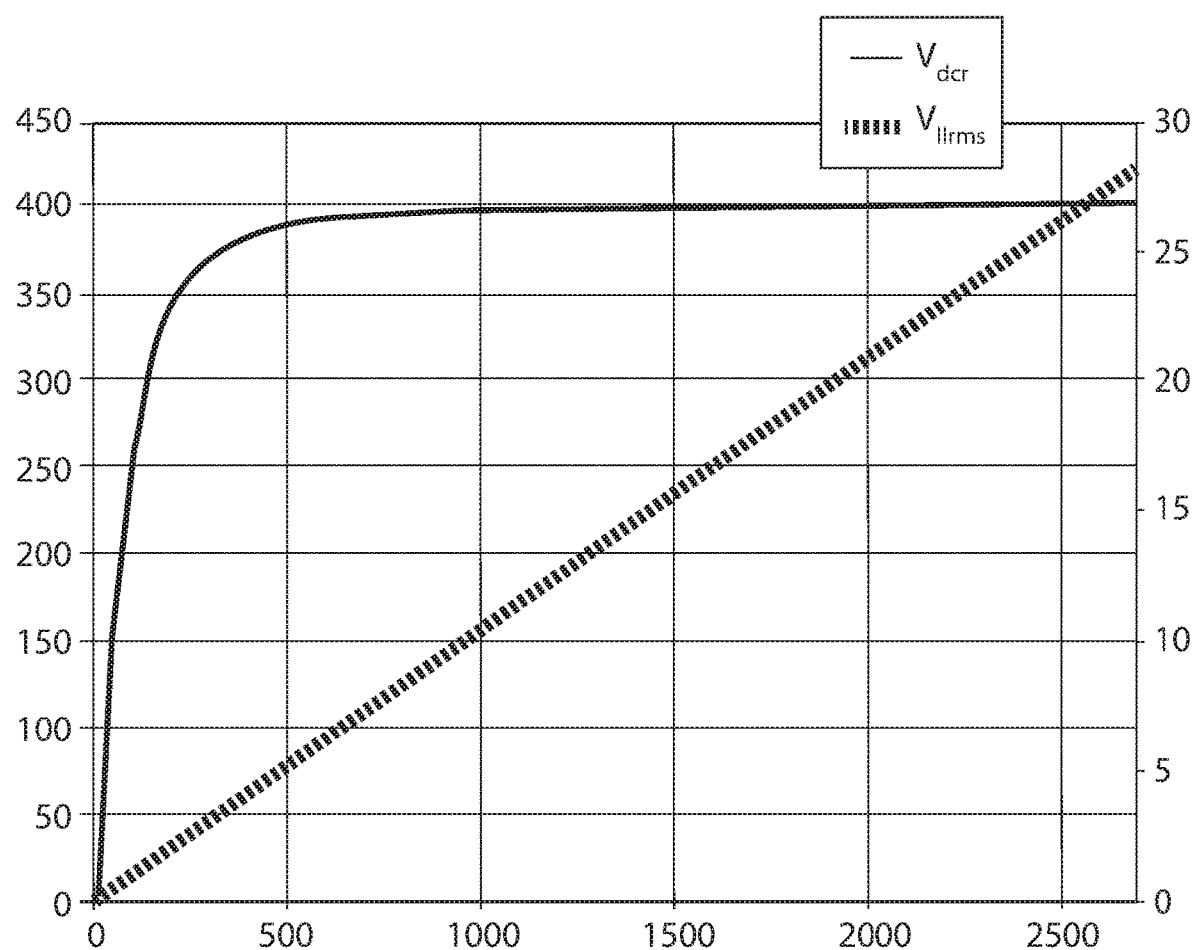
FIG. 4 is a chart of performance of an embodiment of the circuit of FIG. 3, showing a DC voltage in a predetermined load state (right scale in volts, linear solid line) and an AC voltage (left scale in volts RMS) as a function of generator frequency (bottom scale).

Reference will now be made to the drawings wherein like reference numerals identify similar structural features or aspects of the subject disclosure. For purposes of explanation and illustration, and not limitation, an illustrative view of an embodiment of a converter circuit in accordance with the disclosure is shown in FIG. 1 and is designated generally by reference character 100. Other embodiments and/or aspects of this disclosure are shown in FIGS. 2-4. Certain embodiments described herein can be used to convert AC to DC without active components and also being a smaller and lighter.

Referring to FIG. 1, an AC-DC converter circuit 100 can include a plurality of passive components 101 (e.g., one or more inductors, resistors, rectifiers, and/or diodes) configured to convert AC to DC and to non-linearly regulate output DC voltage to about a selected (e.g., predetermined) maximum (e.g., about 28V to about 32V for aircraft electronics) throughout an AC input voltage range (e.g., from about 50 to about 420 Vrms) and/or generator frequency (e.g., about 300 to about 3000 Hz). In certain embodiments, the plurality of passive components 101 can be configured to also limit power loss as a function of load on a DC side of the circuit 100.

The plurality of passive components 101 can be selected from a group including an inductor 103, a rectifier 105, and a transient voltage suppression (TVS) diode 107 (e.g., a zener diode). In certain embodiments, the plurality of passive components 101 can consist of only the inductor 103, the rectifier 105, and the TVS diode 107 such that there are no other components of the AC-DC converter, active or passive. However, any suitable additional components are contemplated herein. Any suitable rectifier, sized for any suitable frequency, is contemplated herein.

As shown in FIG. 1, the inductor 103 can be on an AC side of the rectifier 105, and the TVS diode 107 can be on the DC side of the rectifier 105. In certain embodiments, the inductor 103 can be disposed in series with the rectifier 105, e.g., as shown, and the TVS diode 107 can be in parallel with the rectifier 105 and an output line 109, e.g., as shown. The TVS diode 107 can be disposed between the output line 109 and a return line 111, e.g., as shown (e.g., connected to ground as shown).

FIG. 2 is a chart of performance of an embodiment of the circuit 100. The chart of FIG. 2 shows a DC voltage $V_{dc0}$ in a no load condition (left scale in volts), a DC voltage $V_{dcr}$ in a maximum load condition (left scale in volts), an AC voltage $V_{\|rms}$ (right scale in volts), a power loss $P_0$ in the no load condition (left scale in watts), and a power loss $P_z$ in the maximum load condition (left scale in watts) as a function of generator frequency (bottom scale). FIG. 2 shows a maximum loss of 5 W at no load and almost no loss at full load.

The inductor 103 and/or TVS diode 107 can be configured to produce any desired output voltage (e.g., 28 VDC for aircraft electronics) for any suitable variable or constant load, and/or for any suitable input AC voltage range, for example. For example, the inductor 103 can be sized to have inductance L such that the divider would produce the required output voltage at full load condition. In particular, $L=[V(f_0)-V_0]*RL/(2*PI*f*V_0)$, where: $V_0$ is the output voltage for the converter regulator (CR) control power; $f_0$ is the knee point frequency at which output $V_0$ is required; $V(f_0)$ is the PMG voltage $(V\|_{rms})$ at frequency $f_0$; RL is the CR control power full load equivalent resistance; and L is the inductance required for the voltage divider.

Referring additionally to FIG. 3, in certain embodiments, the AC-DC conversion circuit 200 can have a plurality of passive components 101 that can include an inductor 103, a resistor 207, and a rectifier 105. The inductor 103 and the resistor 207 can be disposed on an AC side of the rectifier 105, e.g., as shown. In certain embodiments, the inductor 103 and the resistor 207 can be disposed in parallel with the rectifier 105, e.g., as shown, for example.

FIG. 4 is a chart of performance of an embodiment of the circuit 200. FIG. 4 shows a DC voltage $V_{dcr}$ in a predetermined load state (right scale in volts, linear solid line) and an AC voltage $V_{\|rms}$ (right scale in volts) as a function of generator frequency (bottom scale). FIG. 4 assumed a fixed load wherein the inductor 103 and the resistor 207 are selected to have values to produce a desired output of voltage based on the to-be-input AC range and a fixed load, for example.

In certain embodiments, the output DC voltage can be within 10% of 28 VDC. Any other suitable value is contemplated herein. In certain embodiments, the converter circuit 100 can cause a maximum power loss of about 5 Watts or less, e.g., as shown in FIG. 2 (e.g., maximum loss at no load, almost zero loss at full load).

As shown, the plurality of passive components 101 can at least form a non-linear voltage divider. In certain embodiments, the output voltage can be about constant above a 400 Hz generator frequency, for example.

In certain embodiments, the converter circuit 100 can consist of only passive components, without having any active components at all. Any other suitable components are contemplated herein, however.

In accordance with at least one aspect of this disclosure, embodiments can include an all-passive variable frequency non-linear AC-DC converter circuit can be configured to non-linearly convert AC voltage to DC voltage using only passive components. The passive components can be any suitable passive components, e.g., as disclosed herein or any other suitable passive components arranged in any suitable manner configured to produce a result as disclosed herein.

In accordance with at least one aspect of this disclosure, a method can include non-linearly converting variable AC voltage to a selected DC voltage using only passive components. The method can include any other suitable method and/or portion thereof.

Embodiments utilize a minimum number of passive only components to derive a desired voltage (e.g., 28V control power for converter regulators CRs) from the wide range of input voltages. Certain embodiments utilize a passive frequency dependent non-linear voltage divider. In certain embodiments, part of the voltage divider components are in the AC side, and part of the divider components are in the DC side. Certain embodiments include extremely simple circuits, extremely low component counts, and all passive components for example. Therefore embodiments can provide much higher reliability, and cost and size/weight can be much lower than traditional systems.

Certain embodiments include a zener diode or other TVs diode on the DC side. This can cause voltage regulation to almost constant and can cause shunting at high voltage. Any suitable transient-voltage-suppression diode, or any other suitable diode configured to shunt at high voltage is contemplated herein.

As shown in FIGS. 2 and 4, PMG voltage (AC voltage) is linearly proportional to the rotor speed and hence frequency. Embodiments include a voltage divider that has high attenuation at high frequency but low attenuation at low frequency to produce a close to constant output voltage, for example.

Impedance of an inductor increases linearly with frequency, so a voltage divider that has an inductor and a resistor (e.g., as shown in FIG. 3) can be configured to include a desired frequency response. As shown in FIG. 4, the output voltage is seen almost constant above 400 Hz. In certain inductor-resistor (L-R) voltage divider embodiments, both components are on the AC side. Such an embodiment is a non-linear voltage divider that can perform well in certain scenarios (e.g., with fixed loads) and provide an all passive voltage regulated frequency dependent non-linear AC-DC converter circuit with near constant DC voltage output, at least above a certain frequency (e.g., 400 Hz as shown or any other suitable frequency).

For applications where load can vary from no load to full load, the output voltage would vary (also commonly referred to as load regulation) as result of load change for an L-R. To limit the output voltage change to an acceptable level, for example ±10%, the resistance R in the frequency dependent divider needs to be lower than 10% of the equivalent full load resistance, which may produce certain losses in power.

If the divider resistor on the AC side is replaced with a Zener (or other suitable TVS diode) on the DC side, the voltage divider loss may be reduced greatly. In such embodiments, e.g., as shown in FIG. 1, this passive device can automatically shunt the current difference between full load current and light/no-load current, for example. Embodiments produce a loss much lower than the that of traditional systems, for example. For example, the loss for an certain embodiments is maximum 5 W at no-load compared to 34 W for a traditional system performing the same AC-DC conversion. The power loss in certain embodiments reduces as load increases, and is close to zero at full load.

Embodiments provide an extremely reliable passive solution to create a low voltage start up control power for converter regulators CRs and other electronics, e.g., in an aircraft, from a wide range PMG voltage. The control power derived from certain embodiments could be used as the backup power for essential loads of converter regulators, for example. Embodiments can also have a component count (e.g., two or three passive components) that is considerably lower than traditional systems (e.g., many active and passive components for a DC-DC converter and associated control and filtering circuits). For example, certain embodiments use only a couple of passive components to derive constant voltage over about a 10:1 input voltage range.

For example, a permanent magnet generator (PMG) speed can vary widely from zero to about 30,000 rpm. A DC voltage derived directly from the PMG (by rectification) can vary from 0V to more than 600V in traditional systems. In normal operation, the control power for CRs may need to be functional over a wide input voltage range of about 50V to about 600V, more than a 10:1 range, for example. CRs receive 3-phase power from the PMG to convert to 28 VDC for supplying the aircraft power. During the start-up phase (e.g., usually milliseconds to seconds, but most likely under one second during engine spool up), control power is needed to control each CR (e.g., to power logic) until each CR is creating 28 VDC and each CR can power itself. During fault condition where output from a CR is no longer 28 VDC, control power can be used as backup power to maintain 28 VDC power supply, for example.

The size, weight, power loss, and cost of certain embodiments of a low voltage control power supply disclosed herein can be considerably lower than previous technologies. Also, as appreciated by those having ordinary skill in the art, no active component has very high reliability. Embodiments can derive control power (of any suitable voltage) from a generator (e.g., a VFG or PMG) using a passive divider.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An AC-DC converter circuit comprising:
a plurality of passive components configured to convert AC to DC and to non-linearly regulate output DC voltage to about a selected maximum throughout an AC input voltage range and/or generator frequency, wherein the plurality of passive components are selected from the group including an inductor, a rectifier, and a transient voltage suppression (TVS) diode, wherein the inductor is on an AC side of the rectifier, and wherein the TVS diode is on a DC side of the rectifier.

2. The AC-DC converter circuit of claim 1, wherein the plurality of passive components are configured to also limit power loss as a function of load on the DC side.

3. The AC-DC converter circuit of claim 1, wherein the plurality of passive components consist of only the inductor, the rectifier, and the TVS diode.

4. The AC-DC converter circuit of claim 1, wherein the inductor is in series with the rectifier, wherein the TVS diode is in parallel with the rectifier and an output line.

5. The AC-DC converter circuit of claim 4, wherein the TVS diode is disposed between the output line and a return line.

6. The AC-DC converter circuit of claim 1, wherein the output DC voltage is within 10% of 28 VDC and/or wherein the converter circuit causes a maximum power loss of about 5 Watts or less.

7. The AC-DC converter circuit of claim 1, wherein the plurality of passive components at least form a non-linear voltage divider.

8. The AC-DC converter circuit of claim 7, wherein the output voltage is about constant above a 400 Hz generator frequency.

9. The AC-DC converter circuit of claim 1, wherein the converter circuit consists of only passive components.

10. The AC-DC converter circuit of claim 1, wherein the plurality of passive components include an inductor, a resistor, and a rectifier.

11. The AC-DC converter circuit of claim 10, wherein the inductor and the resistor are disposed on an AC side of the rectifier.

12. The AC-DC converter circuit of claim 11, wherein the inductor and the resistor are disposed in parallel with the rectifier.

13. An all-passive variable frequency non-linear AC-DC converter circuit configured to non-linearly convert AC voltage to DC voltage using only passive components, wherein the passive components include an inductor, a rectifier, and a transient voltage suppression (TVS) diode, wherein the inductor is on an AC side of the rectifier, and wherein the TVS diode is on the DC side of the rectifier.

14. The all passive variable frequency non-linear AC-DC converter circuit of claim 13, wherein the inductor is in series with the rectifier, wherein the TVS diode is in parallel with the rectifier and an output line.

15. A method comprising:
non-linearly converting variable AC voltage to a selected DC voltage using only passive components, wherein the passive components include an inductor, a rectifier, and a transient voltage suppression (TVS) diode, wherein the inductor is on an AC side of the rectifier, and wherein the TVS diode is on the DC side of the rectifier.

* * * * *